(12) United States Patent
Goh et al.

(10) Patent No.: US 11,474,035 B2
(45) Date of Patent: Oct. 18, 2022

(54) OPTICAL SENSING APPARATUS COMPRISING A PACKAGE STRUCTURE WITH A RECESS PORTION THROUGH WHICH A SCATTERING PATH OF LIGHT IS ALTERED

(71) Applicant: LITE-ON SINGAPORE PTE. LTD., Singapore (SG)

(72) Inventors: Teck-Chai Goh, Singapore (SG); Yu-Chou Lin, New Taipei (TW); Yi Zhang, Wuhan (CN)

(73) Assignee: LITE-ON SINGAPORE PTE. LTD., Singapore (SG)

( * ) Notice: Subject to any disclaimer, the term of this patent is extended or adjusted under 35 U.S.C. 154(b) by 26 days.

(21) Appl. No.: 17/034,649

(22) Filed: Sep. 28, 2020

(65) Prior Publication Data
US 2022/0099571 A1 Mar. 31, 2022

(51) Int. Cl.
*G02B 6/42* (2006.01)
*G01N 21/49* (2006.01)

(52) U.S. Cl.
CPC ........... *G01N 21/49* (2013.01); *G02B 6/4245* (2013.01); *G02B 6/4255* (2013.01)

(58) Field of Classification Search
CPC .... G02B 6/0083; G02B 6/0088; G02B 6/009; G02B 6/0095; G02B 6/4201; G02B 6/4246; G02F 1/133606; G01N 21/51; G01N 2021/516; H01L 27/146
USPC ........................................ 250/239, 216, 221
See application file for complete search history.

(56) References Cited

U.S. PATENT DOCUMENTS 10,678,078 B2 * 6/2020 Kubota ............. G02F 1/133553

\* cited by examiner

*Primary Examiner* — Que Tan Le
(74) *Attorney, Agent, or Firm* — Li & Cai Intellectual Property (USA) Office (57) ABSTRACT

An optical sensing apparatus includes a base, and an emitter and a detector that are respectively disposed on the base. A package structure covers the emitter and the detector, a first recess portion divides the emitter and the detector, and a second recess portion is located on the detector. A scattering path of light generated by the emitter is altered by the first recess portion and the second recess portion.

18 Claims, 6 Drawing Sheets

OPTICAL SENSING APPARATUS COMPRISING A PACKAGE STRUCTURE WITH A RECESS PORTION THROUGH WHICH A SCATTERING PATH OF LIGHT IS ALTERED

FIELD OF THE DISCLOSURE

The present disclosure relates to an optical sensing apparatus, and more particularly to an optical sensing apparatus that can alter a light transmission direction of an emitter.

BACKGROUND OF THE DISCLOSURE

In general, most optical sensing modules include a metal mask component that provides optical isolation between an emitter and a detector, thereby minimalizing unwanted optical crosstalk between the emitter and the detector. However, although the manner of adopting the metal mask component provides optical isolation between the emitter and the detector, disposing the metal mask component increases the production cost of the optical sensing modules. Therefore, an opening is adopted between the emitter and the detector, while still allowing the optical crosstalk of the optical sensing modules to be reduced.

Figure 1:
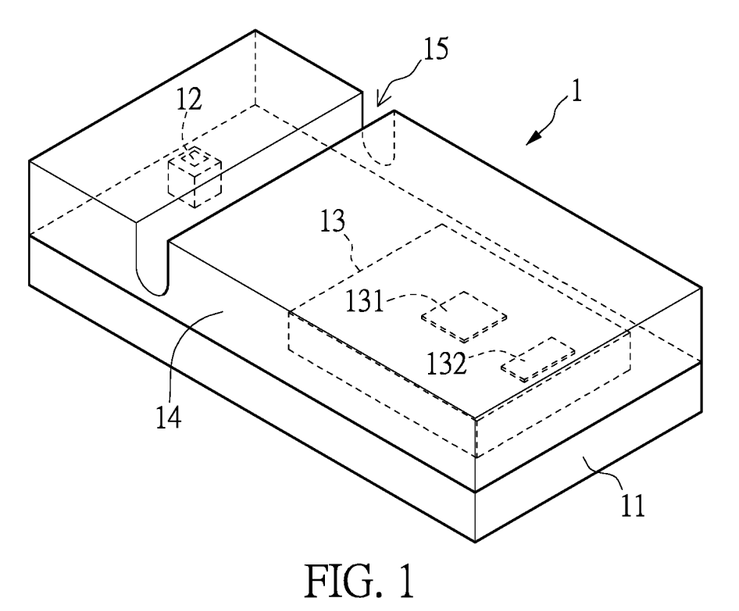
FIG. 1 is a perspective view of a conventional optical sensing apparatus.

FIG. 1 is a perspective view of an existing optical sensing apparatus, as shown in FIG. 1, an optical sensing apparatus 1 includes a base 11, an emitter 12, a detector 13, a package structure 14, and an opening 15. The emitter 12 and the detector 13 are disposed on the base 11, the package structure 14 is disposed on the emitter 12 and the detector 13, and a scattering path of light is altered through forming the opening 15 between the emitter 12 and the detector 13.

However, although a design with an opening may effectively reduce optical crosstalk than a design without the opening, as optical sensing apparatuses are gradually becoming smaller in size, the manner that the opening is located still has a high probability of allowing scattered light from the emitter 12 to be directly transmitted to the detector 13 as shown in FIG. 1, and is unable to reduce the crosstalk to be within a tolerable range.

Therefore, it has become an important issue to be solved in the field to reduce the optical crosstalk and increase the sensing effect of the optical sensing apparatus through improvements in structural design.

SUMMARY OF THE DISCLOSURE

In response to the above-referenced technical inadequacies, the present disclosure provides an optical sensing apparatus. The optical sensing apparatus includes a base, an emitter, a detector, and a package structure. A surface of the base includes a plurality of circuit regions that are independent from each other. The emitter and the detector are respectively disposed on the circuit regions. The package structure directly covers the circuit regions, the emitter and the detector that are respectively disposed on the circuit regions. The package structure includes a first recess portion and a second recess portion. The first recess portion is located between the emitter and the detector, and the second recess portion is located on the detector. The depth of the second recess portion is smaller than the depth of the first recess portion, and a scattering path of light generated from the emitter of the package structure is altered through the first recess portion and the second recess portion.

Therefore, by virtue of disposing the first recess portion, the second recess portion and/or the third recess portion, the optical sensing apparatus of the present disclosure decreases a direct transmission of lights from the emitter to the detector, thereby increasing the sensing precision of the optical sensing apparatus and reducing the effect of an optical crosstalk.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2A:
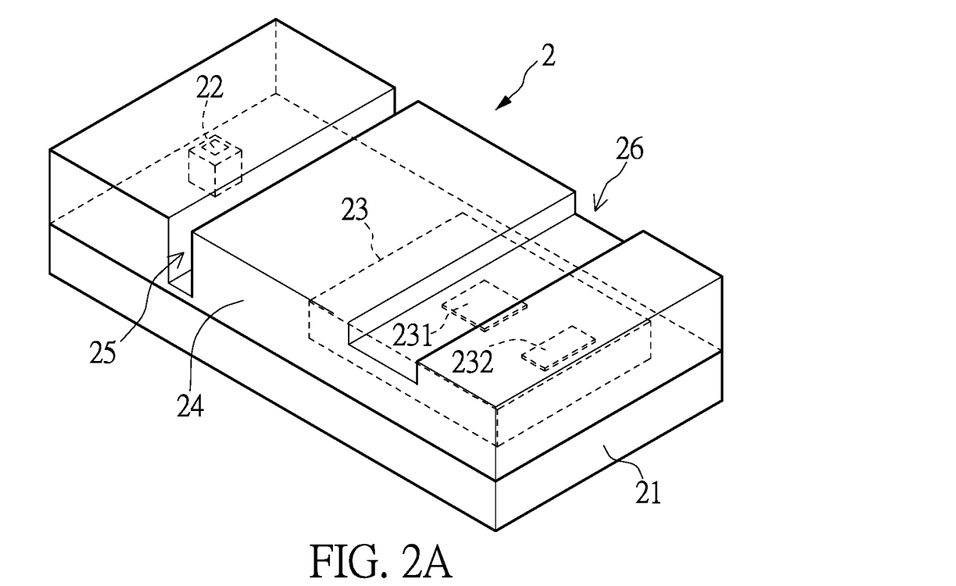
FIG. 2A and FIG. 2B are a perspective schematic view of an optical sensing apparatus and a cross-sectional view of light transmission therein in a first embodiment of the present disclosure.
Figure 2B:
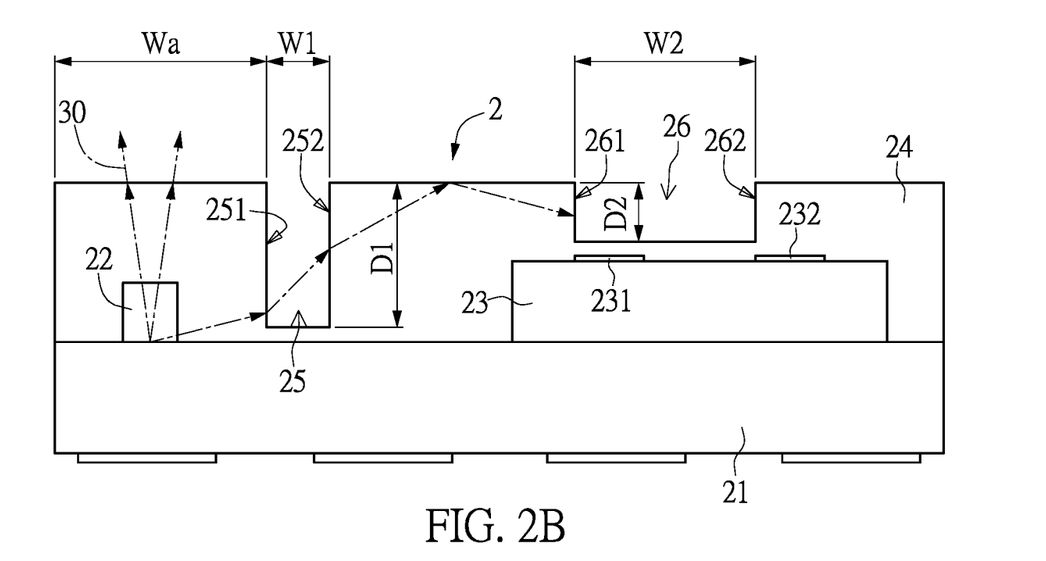

Referring to FIG. 2A and FIG. 2B, a first embodiment of the present disclosure provides an optical sensing apparatus 2. The optical sensing apparatus 2 includes a base 21, an emitter 22, a detector 23, a package structure 24, a first recess portion 25, and a second recess portion 26.

The base 21 is preferably a printed circuit board, a plurality of circuit regions can be preset on the base 21, and the emitter 22 and the detector 23 are disposed on the plurality of circuit regions of the base 21. Moreover, the detector 23 is disposed on the same plane as the emitter 22, and the detector 23 and the emitter 22 are adjacently disposed on the base 21 and spaced apart by a preset interval. The emitter 22 can be a light-emitting element, and the detector 23 can be a light-detecting member, moreover, the emitter 22 can include vertical-cavity surface-emitting laser and a Zener diode, and the detector 23 can be an integrated ambient light and proximity detector, but it is not limited thereto. The detector 23 can simultaneously include a first sensing unit 231 and a second sensing unit 232, or only include the first sensing unit 231, or only include the second sensing unit 232. The first sensing unit 231 can be an ambient light detector, the second sensing unit 232 can be a proximity detector, and the present disclosure is not limited to a type of the detector 23. The first sensing unit 231 is disposed on a position that is close to the first recess portion 25, and the second sensing unit 232 is disposed on a side that is distant from the first recess portion 25, and is used to sense lights reflected to the second sensing unit 232 by a sensed object, after the lights are emitted to the sensed object by the emitter 22.

The package structure 24 directly covers the circuit region of the base 21, the emitter 22 and the detector 23. In addition to preventing the emitter 22 and the detector 23 from being damaged by external forces, the package structure 24 can also impede ambient light from being directly transmitted to the detector 23. The package structure 24 is made of epoxy resin materials or other suitable molding materials that are optically defined as transparent or light-permeable corresponding to electromagnetic signals of a specific wavelength emitted by the emitter 22. For example, when the detector 23 is a single-function infrared proximity detector, the package structure 24 that is transparent can be compounds that are infrared light-permeable. The package structure 24 can also be resins that truncate, filter, or mask a specific wavelength, such that ambient lights can be effectively impeded from being transmitted directly to the detector 23, and prevent the sensing effect from decreasing. For example, when the emitter 22 is the vertical-cavity surface-emitting laser, the package structure 24 can be an infrared-blocking (for illuminance detector) resin, such that the package structure 24 can also be referred to as an infrared-blocking package structure.

In addition, the first recess portion 25 is located between the emitter 22 and the detector 23. Further, a depth D1 of the first recess portion 25 is approximately 0.36 mm, and the depth D1 extends to a position near the base 21, but the base 21 is not exposed from the first recess portion 25, and a width W1 of the first recess portion 25 is approximately 0.2 mm. A purpose for disposing the first recess portion 25 is to alter a transmission path of light scattered by the emitter 22 due to disposing the first recess portion 25, thereby lowering a probability of the scattered light being directly transmitted to the detector 23, and raising a sensing sensitivity of the detector 23. Furthermore, due to disposing the first recess portion 25, light can be limited to be directly transferred in a range Wa of 0.68 mm on a surface of the package structure 24, thereby achieving a purpose of concentrating the light.

The second recess portion 26 is located on the detector 23, but a depth D2 of the second recess portion 26 is approximately 0.15 mm, and a thickness of the package structure 24 at a bottom of the second recess portion 26 is approximately 0.05 mm, with a tolerance range of the thickness within ±0.025 mm, such that the detector 23 is not exposed from the bottom of the second recess portion 26. An opening of the second recess portion 26 extends from a position between the first recess portion 25 and the first sensing unit 231 to a position adjacent to the second sensing unit 232. A width W2 of the second recess portion 26 is approximately 0.56 mm, and is less than a width of the detector 23. In addition, in the embodiment, the width W2 of the second recess portion 26 is at least greater than twice of the width W1 of the first recess portion 25, or greater than widths of the two sensing units 231 and 232, respectively. Specifically, when the first sensing unit 231 is an ambient light detector, the package structure 24 located at the bottom of the second recess portion 26 has a thinner thickness that is beneficial for receiving ambient lights.

Although a probability of scattered light being directly transmitted to the detector 23 is altered through the first recess portion 25, part of the scattered light will still be transmitted to the detector 23 by refraction. Therefore, the second recess portion 26 is located such that the scattered light transmitted toward the detector 23 is refracted again when transmitted through the second recess portion 26, thereby further reducing the probability of the scattered light being transmitted to the detector 23.

Figure 3A:
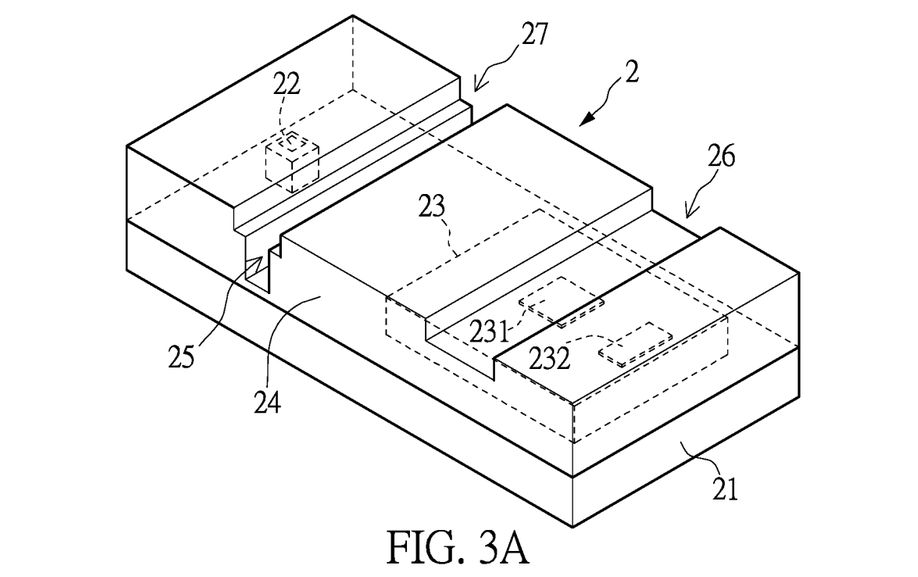
FIG. 3A and FIG. 3B are a perspective schematic view of an optical sensing apparatus and a cross-sectional view of light transmission therein in a second embodiment of the present disclosure.
Figure 3B:
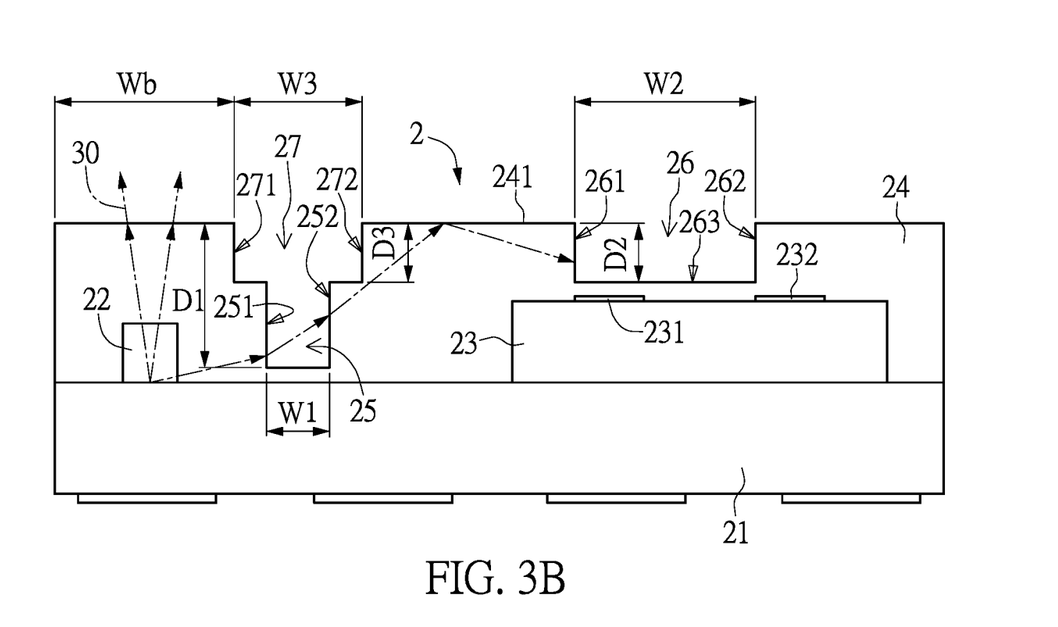

Reference is made to FIG. 3A and FIG. 3B, in which a second embodiment of the present disclosure also provides an optical sensing apparatus 2, but further includes a third recess portion 27.

The width W1 of the first recess portion 25 is approximately 0.2 mm and the third recess portion 27 is located on the first recess portion 25. A width W3 of the third recess portion 27 is approximately 0.4 mm, and is approximately greater than twice of the width W1 of the first recess portion 25. A depth D3 of the third recess portion 27 is substantially equal to the depth D2 of the second recess portion 26, and is approximately between 0.1 and 0.2 mm.

Moreover, the first recess portion 25 and the third recess portion 27 are stacked to form a stepped recess portion, in one preferable embodiment of the present disclosure, the stepped recess portion is left-right symmetric, but in a different embodiment, the stepped recess portion can also be left-right asymmetric, and it is not limited thereto. The purpose of disposing the first recess portion 25 and the third recess portion 27 is that, through disposing the first recess portion 25 and the third recess portion 27, a transmission path of scattered light from the emitter 22 is altered, such that the scattered light is not transmitted to the detector 23 directly and does not cause a misjudgment of the detector 23. Furthermore, due to disposing the third recess portion 27, light can be limited to be directly transferred in a range Wb of 0.58 mm on a surface of the package structure 24, thereby achieving a purpose of concentrating the light.

Reference is made to FIG. 2B and FIG. 3B, in which the first recess portion 25 includes a first side 251 and a second side 252, the second recess portion 26 includes a third side 261 and a fourth side 262, and the third recess portion 27 includes a fifth side 271 and a sixth side 272. As shown in FIG. 2B and FIG. 3B, when light 30 is transmitted through different media, a transmission path thereof is altered. After the emitter 22 emits the light 30, the light 30 is transmitted in the package structure 24. A portion of the light 30 is directly transferred while other portion of the light 30 is scattered. When the light 30 is scattered to the first recess portion 25, a part of the portion of the light 30 that is scattered is refracted or reflected due to changes in media (from solid to gas or gas to solid). The part of the portion of the light 30 that is scattered is refracted to the atmosphere at the first side 251 of the first recess portion 25 or the fifth side 271 of the third recess portion 27, and another part of the portion of the light 30 that is scattered is refracted to the second side 252 of the first recess portion 25 and the sixth side 272 of the third recess portion 27, and transmitted in the package structure 24 again. Then, the portion of the light 30 that is scattered is reflected back in the package structure 24 at a surface 241 of the package structure 24. When the portion of the light 30 that is reflected is refracted again at the third side 261 of the second recess portion 26, part of the portion of light 30 that is reflected is transmitted to a bottom 263 of the second recess portion 26, and the part of the portion of light 30 that is reflected is refracted once again at the bottom 263 of the second recess portion 26, thereby decreasing a probability of the light 30 being directly transmitted to the second sensing unit 232 that is a proximity detector. As shown in FIG. 2B and FIG. 3B, a transmission path of the light 30 is altered due to disposing the first recess portion 25, the second recess portion 26, and/or the third recess portion 27, such that the probability of the light 30 being directly transmitted to the second sensing unit 232 that is the proximity detector is greatly reduced. Furthermore, the occurrence of crosstalk is reduced, and a sensing efficiency of the detector 23 is increased.

Figure 4A:
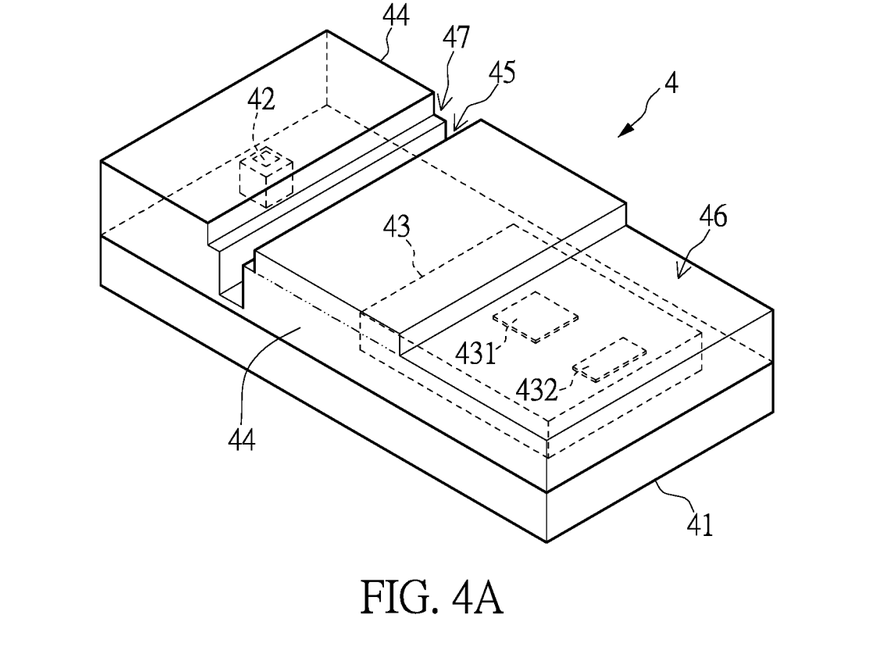
FIG. 4A and FIG. 4B are a perspective schematic view and a cross-sectional view of an optical sensing apparatus in a third embodiment of the present disclosure.
Figure 4B:
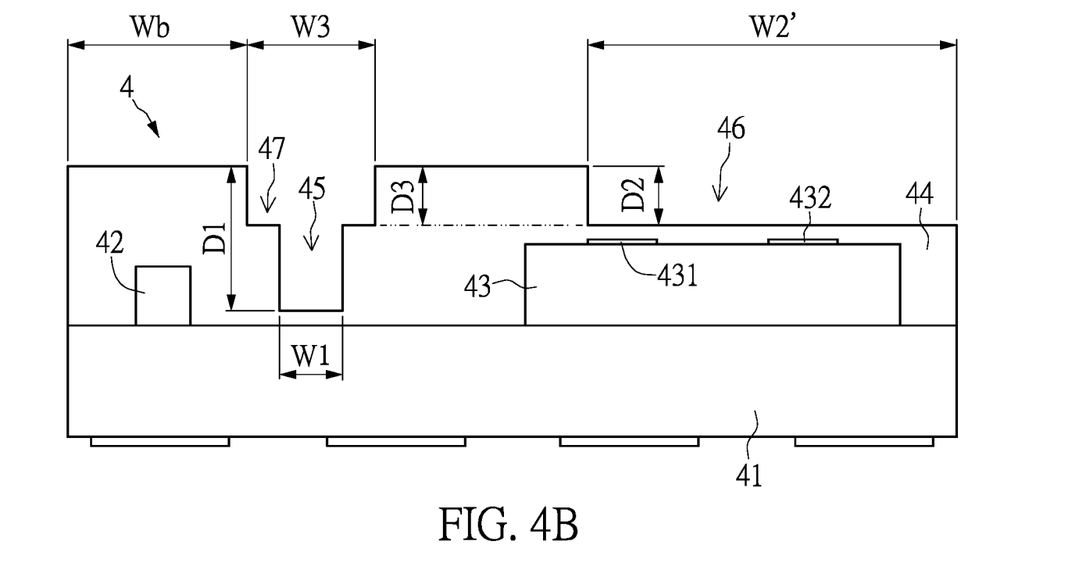
Figure 4C:
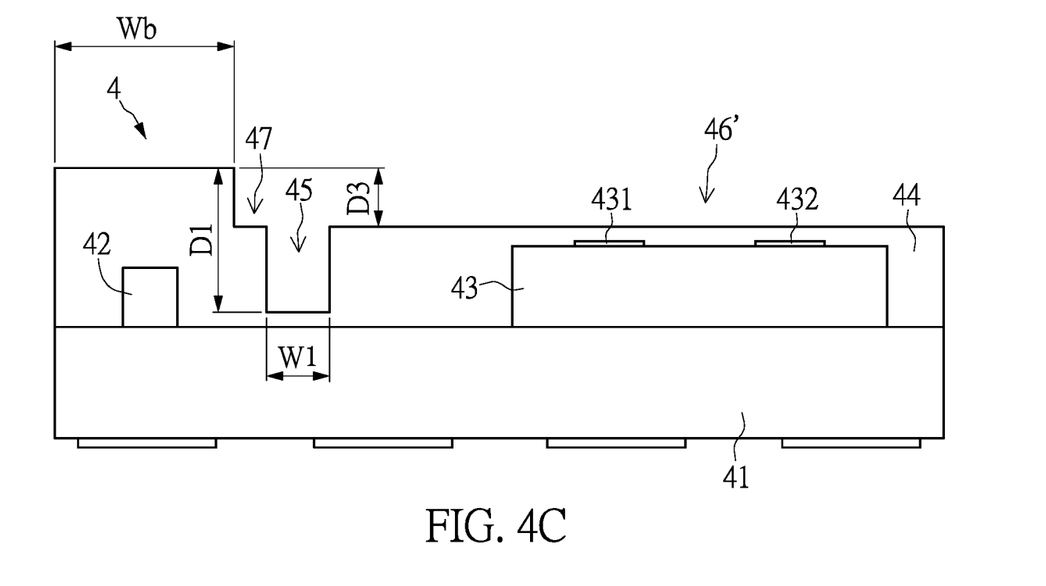
FIG. 4C is a cross-sectional view of an optical sensing apparatus in a fourth embodiment of the present disclosure.

As shown in FIG. 4A, FIG. 4B, and FIG. 4C, in a third and a fourth embodiment of the present disclosure, an optical sensing apparatus 4 includes a base 41, an emitter 42, a detector 43, a package structure 44, a first recess portion 45, a second recess portion 46, 46', and a third recess portion 47.

Since the optical sensing apparatus 4 of the third and the fourth embodiment of the present disclosure includes substantially the same components and connections thereof with the optical sensing apparatus 2 of the first embodiment, the components and connections thereof of the optical sensing apparatus 4 are not reiterated herein.

A width W1 of the first recess portion 45 is approximately 0.2 mm, the third recess portion 47 is located on the first recess portion 45. A width W3 of the third recess portion 47 is at least greater than twice of the width W1 of the first recess portion 45. The base 41 is preferably not exposed from the bottom of the first recess portion 45, therefore, a depth D1 of the first recess portion 45 is required to be less than a thickness of the package structure 44. Moreover, the first recess portion 45 and the third recess portion 47 are stacked to form a stepped recess portion, in one preferable embodiment of the present disclosure, the stepped recess portion is left-right symmetric, but in a different embodiment, the stepped recess portion can also be left-right asymmetric, and it is not limited thereto. Furthermore, due to disposing the third recess portion 47, light can be limited to be directly transferred in a range Wb of 0.58 mm on a surface of the package structure 44, thereby achieving a purpose of concentrating the light. The second recess portion 46 is located on the detector 43, and a depth D2 of the second recess portion 46 is approximately 0.15 mm, and an upper surface of the detector 43 is covered by the package structure 44 having a thickness of approximately 0.025 to 0.075 mm, such that the detector 43 is not exposed from a bottom of the depth D2 the second recess portion 46. An opening W2' of the second recess portion 46 extends from a position of a side of a first sensing unit 431 to an edge of the package structure 44.

In the optical sensing apparatus 4 of the fourth embodiment, compared to the second recess portion 46 of the third embodiment, the second recess portion 46' of the fourth embodiment extends from a side edge of the package structure 44 to a position above an opening of the first recess portion 45. In other words, the second recess portion 46' of the fourth embodiment is in spatial communication with the first recess portion 45 and forms an L-shaped notch. The optical sensing apparatus 4 can further include the third recess portion 47, and the third recess portion 47 is located on the first recess portion 45. The first recess portion 45 and a side edge of the third recess portion 47 are stacked to form a stepped recess portion, and another side of the third recess portion 47 is in spatial communication with the second recess portion 46'. Through the first recess portion 45, the second recess portion 46' and/or the third recess portion 47 of the fourth embodiment, a light transmission path of light emitted from the emitter 42 can likewise be altered, and the probability of the light being transmitted directly to the detector 43 is reduced.

It should be noted that, in different embodiments, widths or depths of the first recess portion 25, 45, the second recess portion 26, 46, and the third recess portion 27, 47 may be different and are not limited to as shown in figures. The widths or depths of the first recess portion 25, 45, the second recess portion 26, 46, and the third recess portion 27, 47 may be adjusted according to different emitter 22, 42, different detector 23, 43, or different transmission characteristics of different lights or sensitivity of the detector 23, 43.

Figure 5:
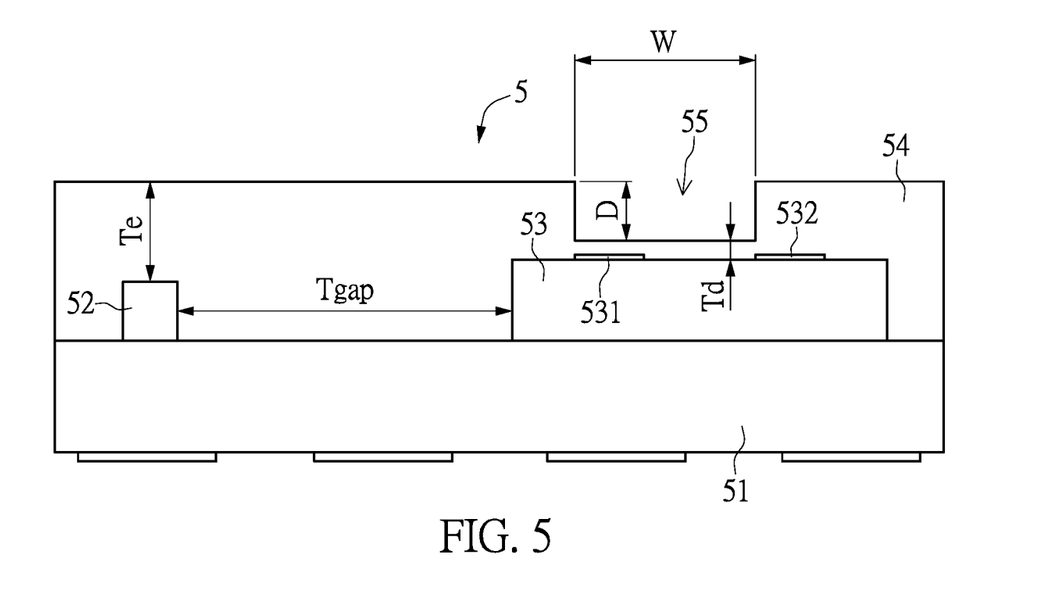
FIG. 5 is a cross-sectional view of an optical sensing apparatus in a fifth embodiment of the present disclosure.

As shown in FIG. 5, in a fifth embodiment of the present disclosure, an optical sensing apparatus 5 includes a base 51, an emitter 52, a detector 53, a light-blocking package structure 54, and a recess portion 55.

Likewise, since the optical sensing apparatus 5 of the fifth embodiment of the present disclosure includes substantially the same components and connections thereof with the optical sensing apparatus 4 of the third embodiment, and the detector 53 of the optical sensing apparatus 5 also includes a first sensing unit 531 and a second sensing unit 532, therefore, the dispositions and connections of the base 51, the emitter 52, the detector 53, and the light-blocking package structure 54 of the optical sensing apparatus 5 are not reiterated herein.

A depth D of the recess portion 55 is approximately 0.15 mm, a width W of the recess portion 55 is at least greater than twice of a width of the first sensing unit 531, or twice of a width of the second sensing unit 532, and a thickness Td of the light-blocking package structure 54 at a bottom of the recess portion 55 is approximately 0.05 mm, with a tolerance range of the thickness within ±0.025 mm, such that the detector 53 is not exposed from the bottom of the recess portion 55. Specifically, the thickness Td of the light-blocking package structure 54 corresponding to the light-receiving surface of the detector 53 is less than the thickness Te of the light-blocking package structure 54 corresponding to the light-emitting surface of the emitter 52. An opening of the recess portion 55 extends from one side of the first sensing unit 531, across the first sensing unit 531, to one side edge of the second sensing unit 532, or extends from a position at the side of the first sensing unit 531 to an edge of the light-blocking package structure 54. In comparison to the third embodiment, only the recess portion 55 of the optical sensing apparatus 5 of the fifth embodiment can reduce light emitted from the emitter 52 to be directly transmitted to the detector 53 by the light-blocking package structure 54 through a thinner thickness above the detector 53, and further effectively blocks lateral light in conjunction with the light-blocking package structure 54 made of a light-blocking package material.

For example, an opaque infrared-blocking glue is selected as the light-blocking package structure 54 to entirely cover circuit regions of the base 51, the emitter 52 and the detector 53, that is, the opaque infrared-blocking glue has a characteristic in the selected wavelength range. For example, when a thickness of the opaque infrared-blocking glue is 0.3 mm, a light-permeability for light with a wavelength of 700 to 900 nm is lowered to below 60%. When the thickness is increased, the filtered ratio of the light of the wavelength range is also increased, and the light-permeability preferably is below 20%. The light-blocking package structure 54 has an interval Tgap between the emitter 52 and the detector 53, the interval Tgap is at least greater than twice of the original thicknesses of the light-blocking package structure 54, such that at least 80% of infrared light is filtered. The detector 53 can be effectively shielded from the lateral light, and light can be prevented from directly transmitted to the detector 53, while light-emitting of the emitter 52 and light-receiving of the detector 53 are unaffected. A thickness Te of the light-blocking package structure 54 corresponding to a light-emitting surface of the emitter 52 has to let at least 60% of light to pass through, therefore, for an opaque infrared-blocking material, the thickness Te is preferably less than 0.3 mm. That is, the interval Tgap between the emitter 52 and the light-blocking package structure 54 of the detector 53 is at least greater than twice of the thickness Te of the light-blocking package structure 54 corresponding to a light-emitting surface of the emitter 52, and the thickness Te of the light-blocking package structure 54 corresponding to a light-emitting surface of the emitter 52 is greater than the thickness Td of the light-blocking package structure 54 corresponding to a light-receiving surface of the detector 53, that is, the interval Tgap is greater than twice of the thickness Te and greater than the thickness Td.

When the optical sensing apparatus includes only a first recess portion, without having a second recess portion and a third recess portion located thereon, and light intensity of light transmitted to a position close to the detector is approximately 1.2240 E−6 Watts/cm$^2$. When the optical sensing apparatus includes only the first recess portion and the second recess portion, without having the third recess portion located thereon, and light intensity of light transmitted to a position close to the detector is approximately 1.0707 E−6 Watts/cm$^2$. It can be observed that, due to the optical sensing apparatus including the second recess portion, the light intensity of light transmitted to a position close to the detector is approximately decreased by 15%. In the second embodiment of the present disclosure, when the optical sensing apparatus includes the first recess portion, the second recess portion, and the third recess portion, and light intensity of light transmitted to a position close to the detector is approximately 3.672 E−7 Watts/cm$^2$. The light intensity is approximately decreased by 70% compared to the package structure of a conventional detector with only the first recess portion located thereon. In the third embodiment of the present disclosure, the optical sensing apparatus also includes the first recess portion, the second recess portion, and the third recess portion, and light intensity of light transmitted to a position close to the detector is approximately 3.59 E−7 Watts/cm$^2$. The light intensity is approximately equal to that of the second embodiment, and is approximately decreased by 70% compared to the package structure of the conventional detector with only the first recess portion located thereon.

It can be observed from the test results that, by disposing the first recess portion, the second recess portion, and the third recess portion in the optical sensing apparatus, crosstalk of a second sensing unit can be reduced to at least 100 counts, from 400 to 500 counts of a conventional fluctuation. An excessive crosstalk results in sensing failure of the optical sensing apparatus, and the optical sensing apparatus will perceive a sensed item as being constantly close thereto, such that a screen of a mobile device will not be switched off.

Figure 6:
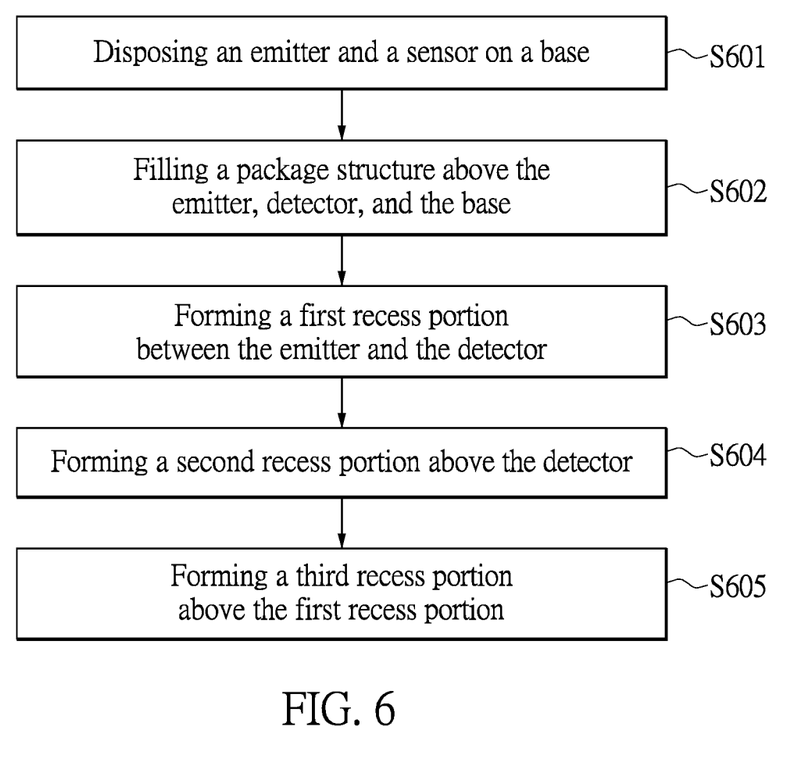
FIG. 6 is a flowchart of a manufacturing process for producing the optical sensing apparatuses according to the embodiments of the present disclosure.

FIG. 6 is a flowchart of manners for producing the optical sensing apparatuses according to the embodiments of the present disclosure. As shown in FIG. 6, in conjunction with numerals of the first embodiment of the present disclosure, in step S601, an emitter 22 and a detector 23 are disposed on a base 21, and the emitter 22 and the detector 23 are spaced apart by an interval, such that in subsequent production process, an opening may be formed on the interval between the emitter 22 and the detector 23. In step S602, a package structure material is filled on the emitter 22, the detector 23, and the base 21, a package structure 24 is filled thereon, and a material of the package structure 24 is baked, the package structure 24 protects the emitter 22 and the detector 23, and also blocks some ambient light, so that only light of a specific wavelength (such as infrared light) are transmitted to the detector 23. Manners of filling the package structure 24 and baking the material of the package structure 24 are well known by skilled personnel in the art, and are not reiterated herein.

In step S603, a first recess portion 25 is formed between the emitter 22 and the detector 23, and the first recess portion 25 is formed by a manner of laser etching, in different embodiments, the first recess portion 25 can also be formed by a manner of cutting. Based on the size of the detector 23, different processing methods may be applied to form the first recess portion 25, and it is not limited thereto. Then, in step S604, a second recess portion 26 is formed on the detector 23, a manner of forming the second recess portion 26 can be the same as the manner of forming the first recess portion 25, and the second recess portion 26 can be formed in the same process with the first recess portion 25, or the second recess portion 26 can be formed after the first recess portion 25 is formed, and it is not limited thereto. Through the abovementioned processes, the optical sensing apparatus 2 of the present disclosure is produced. The abovementioned processes are only a description of a manner for forming the optical sensing apparatus 2 of the present disclosure, and the optical sensing apparatus 2 of the present disclosure is not limited to be formed by the abovementioned production processes. For example, in different embodiments, the first recess portion 25 or the second recess portion 26 can be formed by using a mold with a height difference, and the first recess portion 25 or the second recess portion 26 can be formed without using a manner of laser etching or cutting.

Furthermore, step S604 can be further included in a manufacturing process for producing the optical sensing apparatus according to different embodiments. In step S604, the second recess portion 26 is formed on the detector 23. As shown in FIG. 2A and FIG. 2B, the first recess portion 25 and the second recess portion 26 may be formed by, for example, etching the package structure 24. The first recess portion 25 and the second recess portion 26 may also be formed by a manner of cutting. The first recess portion 25 and the second recess portion 26 may be formed in the same production step, or the first recess portion 25 and the second recess portion 26 may be formed in two different steps, and it is not limited thereto.

Moreover, step S605 can be further included in another embodiment of the present disclosure. In step S605, the third recess portion 27 is formed on the first recess portion 25. Manner of forming the second recess portion 26 and the third recess portion 27 may be the same as the manner for forming the first recess portion 25, and the second recess portion 26 and the third recess portion 27 may be formed in the same production step as the first recess portion 25, or the second recess portion 26 and the third recess portion 27 may be formed after the first recess portion 25 is formed, and it is not limited thereto. By the aforementioned production processes, the optical sensing apparatus 2 of the present disclosure is produced. The aforementioned production processes are an iteration of manners for forming the optical sensing apparatus 2 of the present disclosure, and the optical sensing apparatus 2 of the present disclosure is not limited to be formed by using the aforementioned production steps, and it is not limed thereto.

In conclusion, by virtue of disposing the first recess portion, the second recess portion and/or the third recess portion, the optical sensing apparatus of the present disclosure decreases a direct transmission of lights from the emitter to the detector, thereby increasing the sensing precision of the optical sensing apparatus and reducing the effect of an optical crosstalk.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An optical sensing apparatus, comprising:
   a base, wherein a surface thereof includes a plurality of circuit regions that are independent from each other;
   an emitter and a detector disposed respectively on the plurality of circuit regions; and
   a package structure directly covering the plurality of circuit regions, the emitter and the detector thereon, and the package structure includes:
   a first recess portion located between the emitter and the detector; and
   a second recess portion located on the detector;
   wherein a depth of the second recess portion is smaller than a depth of the first recess portion, and wherein in the package structure, a scattering path of light generated from the emitter is changed through the first recess portion and the second recess portion.

2. The optical sensing apparatus of claim 1, wherein a thickness of the package structure located at the second recess portion is no less than 0.05 mm.

3. The optical sensing apparatus of claim 2, wherein the detector includes a first detector unit and a second detector unit, and an opening of the second recess portion extends from a position between the first recess portion and the first detector unit to a position adjacent to the second detector unit.

4. The optical sensing apparatus of claim 3, wherein the opening of the second recess portion extends across the detector to an edge of the package structure.

5. The optical sensing apparatus of claim 1, further comprising a third recess portion located on the first recess portion, wherein a width of the third recess portion is greater than a width of the first recess portion.

6. The optical sensing apparatus of claim 5, wherein the detector includes a first detector unit and a second detector unit, and wherein an opening of the second recess portion extends from a position between the first recess portion and the first detector unit to a position adjacent to the second detector unit.

7. The optical sensing apparatus of claim 5, wherein a depth of the third recess portion is equal to a depth of the second recess portion.

8. The optical sensing apparatus of claim 1, wherein the detector includes a first detector unit and a second detector unit, and wherein an opening of the second recess portion extends from a position between the first recess portion and the first detector unit to a position adjacent to the second detector unit.

9. The optical sensing apparatus of claim 8, wherein the opening of the second recess portion does not extend to a position on the second detector unit.

10. The optical sensing apparatus of claim 8, wherein the opening of the second recess portion extends across the first detector unit and the second detector unit to an edge of the package structure.

11. The optical sensing apparatus of claim 8, wherein the first detector unit is an ambient light sensor, and the second detector unit is a proximity sensor.

12. An optical sensing apparatus, comprising:
    a base, wherein a surface thereof includes a plurality of circuit regions that are independent from each other;
    an emitter and a detector respectively disposed on the circuit regions; and
    a light-blocking package structure covering the circuit regions, the emitter and the detector thereon, and the light-blocking package structure includes a recess portion located on the detector, wherein the recess portion has a depth; and
    wherein in the light-blocking package structure, a scattering path of light generated from the emitter is altered through the recess portion.

13. The optical sensing apparatus of claim 12, wherein the detector includes a first detector unit and a second detector unit, the first detector unit being adjacent to the emitter, and wherein an opening of the recess portion extends across the first detector unit and the second detector unit to an edge of the light-blocking package structure.

14. The optical sensing apparatus of claim 12, wherein the detector includes a first detector unit and a second detector unit, and an opening of the recess portion extends from a position of the first detector unit to a position adjacent to the second detector unit.

15. The optical sensing apparatus of claim 12, wherein the light-blocking package structure includes an interval between the emitter and the detector, and the interval is at least greater than twice of a thickness of the light-blocking package structure corresponding to a light-emitting surface of the emitter.

16. The optical sensing apparatus of claim 15, wherein the interval is greater than twice of an original thickness of the light-blocking package structure.

17. The optical sensing apparatus of claim 15, wherein the light-blocking package structure further includes a thickness, which is corresponding to a light-receiving surface of the detector, formed at a bottom of the recess portion and less than the thickness of the light-blocking package structure corresponding to the light-emitting surface of the emitter.

18. The optical sensing apparatus of claim 15, wherein the light-blocking package structure is opaque infrared-blocking glue.

\* \* \* \* \*